(12) United States Patent
Leng et al.

(10) Patent No.: US 12,288,880 B2
(45) Date of Patent: Apr. 29, 2025

(54) POSITIVE ACTIVE MATERIAL, LITHIUM ION SECONDARY BATTERY, BATTERY MODULE, BATTERY PACK AND ELECTRIC DEVICE

(71) Applicant: CONTEMPORARY AMPEREX TECHNOLOGY (HONG KONG) LIMITED, Hong Kong (CN)

(72) Inventors: Xue Leng, Ningde (CN); Hongyu Liu, Ningde (CN); Changfeng Bie, Ningde (CN); Na Liu, Ningde (CN); Wanqing Cai, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 102 days.

(21) Appl. No.: 17/935,125

(22) Filed: Sep. 25, 2022

(65) Prior Publication Data

US 2023/0035380 A1 Feb. 2, 2023

Related U.S. Application Data

(63) Continuation of application No. PCT/CN2021/073158, filed on Jan. 21, 2021.

(51) Int. Cl.
*H01M 4/58* (2010.01)
*H01M 10/05* (2010.01)
(Continued)

(52) U.S. Cl.
CPC ..... *H01M 4/5825* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS 8,906,553 B1 12/2014 Hagh et al.
2016/0294001 A1 10/2016 Suga et al.

FOREIGN PATENT DOCUMENTS

CN 101752562 * 6/2010 .......... H01M 4/1397
CN 103094580 A 5/2013
(Continued)

OTHER PUBLICATIONS

International Search Report received in PCT Application PCT/CN2021/073158 on Sep. 27, 2021.
(Continued)

*Primary Examiner* — Barbara L Gilliam
*Assistant Examiner* — Angela J Martin
(74) *Attorney, Agent, or Firm* — K&L Gates LLP (57) ABSTRACT

A positive active material is provided. In some embodiments, the positive material includes: a substrate and a coating layer coating the substrate, wherein the coating layer includes a fast ion conductor layer and a carbon coating layer, the substrate includes more than one compound of formula (I): $LiFe_{1-a}M1_aPO_4$ formula (I), in formula (I), M1 is more than one selected from Cu, Mn, Cr, Zn, Pb, Ca, Co, Ni, Sr, Nb and Ti, and $0 \leq a \leq 0.01$; the fast ion conductor layer includes a fast ion conductor of a NASICON structure shown in formula (II), $Li_{3-b}Fe_{2-b}M2_b(PO_4)_3$ formula (II), in formula (II), M2 is more than one selected from Ti, Zr, Hf, Ge and Sn with valence of +4, and $0 \leq b \leq 1$.

20 Claims, 4 Drawing Sheets

(51) Int. Cl.
  *H01M 10/0525*   (2010.01)
  *H01M 4/02*   (2006.01)

(56) References Cited

FOREIGN PATENT DOCUMENTS

| | | | | |
|---|---|---|---|---|
| CN | 103400962 | * | 11/2013 | ............ B01J 19/00 |
| CN | 103400962 | A | 11/2013 | |
| CN | 108206176 | A | 6/2018 | |
| CN | 108206276 | * | 6/2018 | ........ H01M 10/0525 |
| CN | 108206276 | A | 6/2018 | |
| CN | 109461964 | A | 3/2019 | |
| CN | 109713237 | A | 5/2019 | |
| CN | 110858643 | A | 3/2020 | |
| JP | 2006190528 | * | 7/2006 | ............ H01M 4/36 |
| JP | 2006190528 | A | 7/2006 | |
| JP | 2011018547 | A | 1/2011 | |
| JP | 2014022293 | A | 2/2014 | |
| JP | 2018163763 | A | 10/2018 | |
| KR | 20190057259 | A | 5/2019 | |
| WO | 2012172831 | A1 | 12/2012 | |

OTHER PUBLICATIONS

Written Opinion received in PCT Application PCT/CN2021/073158 on Sep. 27, 2021.
Decision to Grant a Patent received in the corresponding Japanese application 2022-557160, mailed on Oct. 17, 2023.
Pignanelli Fernando et al: "Insights of cobalt doping on carbon-coated LiFePO4olivine nanoparticles prepared by citric acid combustion route as cathodes for lithium batteries", Ionics, Kiel, DE, vol. 25, No. 8, Feb. 19, 2019 (Feb. 19, 2019), pp. 3593-3601.
The extended European search report received in the corresponding European application 21920263.7, mailed May 11, 2023.
English translation of the written opinion received in the corresponding international application PCT/CN2021/073158, mailed Sep. 27, 2021.
First Office Action received in the corresponding Chinese application 202180043383.9, mailed on Jun. 19, 2024.
First Office Action received in the corresponding Chinese application 10-2022-7032770, mailed on May 17, 2024.
Notice of Grant of Invention Patent Right received in the corresponding Chinese application 202180043383.9, mailed on Dec. 11, 2024.
Written Decision on Registration received in the corresponding Korean application 10-2022-7032770, mailed on Nov. 19, 2024.

* cited by examiner

POSITIVE ACTIVE MATERIAL, LITHIUM ION SECONDARY BATTERY, BATTERY MODULE, BATTERY PACK AND ELECTRIC DEVICE

CROSS-REFERENCE TO RELATED APPLICATIONS

This application is a continuation of International Application PCT/CN2021/073158, filed Jan. 21, 2021, and entitled "POSITIVE ELECTRODE ACTIVE MATERIAL, LITHIUM ION SECONDARY BATTERY, BATTERY MODULE, BATTERY PACK AND POWER DEVICE", which is incorporated herein by reference in its entirety.

TECHNICAL FIELD

The present disclosure pertains to the field of electrochemical technologies, and particularly relates to a positive active material, a lithium ion secondary battery, a battery module, a battery pack and an electric device.

BACKGROUND ART

With a rapid development of new energy fields, secondary batteries, particularly lithium ion secondary batteries, are widely applied to various large power devices, energy storage systems and various consumer products by virtue of advantages of an excellent electrochemical performance, no memory effect, small environmental pollution, or the like.

Currently, lithium iron phosphate is one of most widely used positive active materials of the lithium ion batteries. Compared with a ternary positive active material, the lithium iron phosphate has obvious advantages in safety performance, cycle performance and cost, and has large-scale disclosure to the fields of commercial vehicles, passenger vehicles and large-scale energy storage.

However, the lithium ion secondary battery fabricated from the conventional lithium iron phosphate material often has low energy density, and cannot meet requirements of some large-scale electric devices, such that higher requirements are put forward for a development of the secondary battery based on the lithium iron phosphate.

Based on this, the present disclosure develops a positive active material having a high gram capacity and high powder compaction density, as well as a lithium ion secondary battery having high energy density.

SUMMARY

In view of the problem in the background art, the present disclosure provides a positive active material with a high gram capacity and high powder compaction density, and a lithium ion secondary battery fabricated from the positive active material according to the present disclosure has improved energy density and further has an excellent cycle performance on the premise of having high energy density.

An object of the present disclosure is to provide a positive active material having a high gram capacity.

An object of the present disclosure is to provide a positive active material having improved powder compaction density.

An object of the present disclosure is to provide a positive plate having improved electrode plate compaction density.

An object of the present disclosure is to provide a lithium ion secondary battery having high energy density.

The inventor finds that one or more of the above objects can be achieved by applying the solution of the present disclosure.

A first aspect of the present disclosure provides a positive active material, including a substrate and a coating layer, wherein the coating layer coats the substrate, and the coating layer includes a fast ion conductor layer and a carbon coating layer, the substrate includes more than one compound as shown in formula (I):

$$\text{LiFe}_{1-a}\text{M1}_a\text{PO}_4 \qquad \text{formula (I)},$$

in the formula (I), M1 is more than one selected from Cu, Mn, Cr, Zn, Pb, Ca, Co, Ni, Sr, Nb and Ti, and $0 \le a \le 0.01$, the fast ion conductor layer includes a fast ion conductor of a NASICON structure as shown in formula (II), $$\text{Li}_{3-b}\text{Fe}_{2-b}\text{M2}_b(\text{PO}_4)_3 \qquad \text{formula (II)},$$

in the formula (II), M2 is more than one selected from Ti, Zr, Hf, Ge and Sn with valence of +4, and $0 \le b \le 1$.

The positive active material according to the first aspect of the present disclosure fully exerts advantages of a low cost, a high safety performance and good cycle stability of lithium iron phosphate, and meanwhile, the coating layer (the fast ion conductor layer with the fast ion conductor of a NASICON structure and the carbon coating layer) is used, thus solving defects of poor electronic conductivity and ionic conductivity of the lithium iron phosphate and then improving a gram capacity and powder compaction density of the lithium iron phosphate. The lithium ion secondary battery fabricated from the positive active material according to the first aspect of the present disclosure has significantly improved energy density on the premise of having an excellent cycle performance.

In one embodiment in accordance with the present disclosure, in the positive active material, molar weights of the $\text{LiFe}_{1-a}\text{M1}_a\text{PO}_4$ and the $\text{Li}_{3-b}\text{Fe}_{2-b}\text{M2}_b(\text{PO}_4)_3$ have a ratio of $(1-x):x$, and $0<x\le0.005$.

In the positive active material according to the present disclosure, the fast ion conductor of a NASICON structure has a molar weight x, and when $0<x\le0.005$, the positive active material has an excellent gram capacity. Introduction of a proper quantity of the fast ion conductor of a NASICON structure into the lithium iron phosphate can effectively solve the problem of the poor ionic conductivity, improve the gram capacity of the lithium iron phosphate, and improve the energy density of the corresponding lithium ion secondary battery.

In one embodiment in accordance with the present disclosure, carbon has a mass percentage content C % of 1%-1.5% in the positive active material, the positive active material has a specific surface area S of 10 m²/g-15 m²/g, and a ratio of the specific surface area S to the carbon content C % of the positive active material satisfies $9 \le S/C \le 12$.

The carbon coating layer is an important component for improving the overall electronic conductivity of the positive active material according to the present disclosure.

On the one hand, the carbon coating layer is loose and porous, such that an electrolyte solution can be in full and effective contact with the lithium iron phosphate substrate, transport of lithium ions at a phase interface is guaranteed, and the energy density of the lithium ion secondary battery is improved. On the other hand, the appropriate carbon content (1%-1.5%) can obviously improve the electronic conductivity of the positive active material, so as to improve the energy density of the lithium ion secondary battery. However, carbon is an inactive substance, and when a carbon coating amount is over large, an active substance content is decreased, thus reducing the total gram capacity of the positive active material.

The loose and porous carbon coating layer is a main contributor of the specific surface area of the positive active material according to the present disclosure. The specific surface area (10 m$^2$/g-15 m$^2$/g) of the positive active material within a proper range is beneficial to improving a contact area between the electrolyte solution and the positive active material, improving reaction dynamics of the battery and improving the energy density of the battery.

The ratio S/C of the carbon content to the specific surface area of the positive active material according to the present disclosure greatly influences the gram capacity of the positive active material and the cycle performance of the lithium ion secondary battery. Under a condition of basically consistent powder compaction density, when the ratio S/C of the mass percentage content of the carbon in the positive active material to the specific surface area of the positive active material is within the reasonable range, the positive active material has a high gram capacity, and the corresponding lithium ion secondary battery also has an excellent cycle performance.

In one embodiment in accordance with the present disclosure, free lithium is present in the positive active material.

The free lithium in the present disclosure is inactive free lithium which cannot be inserted into/extracted from the positive active material, is unavoidable in a process of synthesizing the lithium-iron-phosphate positive active material, generally exists in a form of lithium phosphate, or the like, outside a bulk phase structure of the lithium iron phosphate substrate, and is different from active lithium located in a bulk phase structure of the lithium iron phosphate substrate.

In one embodiment in accordance with the present disclosure, optionally, the positive active material has pH not less than 9.

The existence of the ion conductor layer with the fast ion conductor of a NASICON structure accelerates dissolution of the active lithium in the bulk phase structure of the lithium iron phosphate substrate in the present disclosure, such that the positive active material according to the present disclosure has a pH value higher than that of the lithium iron phosphate only coated with carbon but not containing the fast ion conductor layer.

In one embodiment in accordance with the present disclosure, optionally, free lithium is present in the positive active material, and the pH of the positive active material and a mass percentage content $N_{Li+}$% of the free lithium satisfy $0.15 \leq pH-(36N_{Li+}+8) \leq 1.1$.

Although a mechanism is still unclear, after lots of experiments and research of the inventor, $pH-(36N_{Li+}+8)$ is in positive correlation with dissolution of the active lithium in the bulk phase structure of the lithium iron phosphate substrate, and the larger a value of $pH-(36N_{Li+}+8)$ is, the higher a capability of transport of the active lithium in the bulk phase structure of the lithium iron phosphate substrate to a surrounding solution is, that is, the better a transport performance of lithium ions at the phase interface between the positive active material according to the present disclosure and the electrolyte solution is, which indicates that the active lithium in the bulk phase structure of the lithium iron phosphate substrate is more easily dissolved due to the introduction of the NASICON type fast ion conductor. When the numerical value of $pH-(36N_{Li+}+8)$ is within a reasonable range, the corresponding positive active material has an excellent gram capacity and an excellent cycle performance.

In one embodiment in accordance with the present disclosure, optionally, the positive active material has a volume average particle size satisfying 1 µm≤Dv50≤2 µm and 0.4 µm≤Dv10≤0.7 µm.

When the volume average particle size of the positive active material satisfies 1 µm≤Dv50≤2 µm and 0.4 µm≤Dv10≤0.7 µm, the positive active material has reasonable overall particle size distribution, which is beneficial to improving the powder compaction density of the positive active material, improving the electrode plate compaction density of the positive plate, and then improving the energy density of the lithium ion secondary battery. The powder compaction density of the positive active material according to the present disclosure is related to the particle size distribution of the positive active material and a particle size of primary particles, and the reasonable particle size distribution of the positive active material and the larger particle size of the primary particles are beneficial to improving the powder compaction density of the positive active material.

In one embodiment in accordance with the present disclosure, optionally, the positive active material is primary particles or a pseudo-single crystal.

An increase of the particle size of the primary particles of the positive active material is another way to improve the powder compaction density of the positive active material. Under a condition of similar particle size distribution, the larger the particle size of the primary particles of the positive active material is, the larger the powder compaction density is, which is beneficial to improving the energy density of the corresponding lithium ion secondary battery.

In one embodiment in accordance with the present disclosure, optionally, the positive active material has powder compaction density $\rho \geq 2.5$ g/cm$^3$.

When the positive active material has high powder compaction density, the positive plate fabricated from the positive active material has high compaction density, and the corresponding lithium ion secondary battery has high energy density.

In one embodiment in accordance with the present disclosure, optionally, the positive active material has powder resistivity $R \leq 11$ Ω·cm.

Compared with lithium iron phosphate not coated with carbon, the positive active material according to the present disclosure has obviously reduced powder resistivity, which indicates that resistance of the positive active material can be obviously reduced by the arrangement of the carbon coating layer.

A second aspect of the present disclosure provides a lithium ion secondary battery, including the positive electrode material according to the first aspect of the present disclosure.

The lithium ion secondary battery according to the second aspect of the present disclosure has improved energy density due to inclusion of the positive active material having an improved gram capacity and improved powder compaction density.

In one embodiment in accordance with the present disclosure, optionally, the lithium ion secondary battery is a button cell, and in a 0.1 C charging-discharging curve of the button cell, a charging-discharging platform exists within a voltage range of 2.5-2.9V vs Li$^+$. The platform can prove the existence of the NASICON fast ion conductor contained in the positive active material according to the present disclosure.

A third aspect of the present disclosure provides a battery module, including the lithium ion secondary battery according to the second aspect of the present disclosure.

A fourth aspect of the present disclosure provides a battery pack, including more than one of the lithium ion secondary battery according to the second aspect of the present disclosure and the battery module according to the third aspect of the present disclosure.

A fifth aspect of the present disclosure provides an electric device, including more than one of the lithium ion secondary battery according to the second aspect of the present disclosure, the battery module according to the third aspect of the present disclosure, and the battery pack according to the fourth aspect of the present disclosure; the lithium ion secondary battery or the battery module or the battery pack may be used as a power source of the electric device or an energy storage unit of the electric device.

The present disclosure provides the positive active material; the positive active material having the fast ion conductor layer of a NASICON structure and the carbon coating layer is synthesized by modifying the lithium iron phosphate, and further by regulating the carbon content and the specific surface area, defining the relationship between the specific surface area and the carbon content, regulating the pH and the content of the free lithium, and defining the relationship between the pH and the content of the free lithium, the ionic conductivity and the electronic conductivity of the lithium ions at the phase interface are improved, thus improving the gram capacity of the lithium iron phosphate. In the present disclosure, the positive active material with high powder compaction density and high electrode plate compaction is obtained by improving the particle size distribution of the primary particles and increasing the particle size of the primary particles of the lithium iron phosphate, and thus, the lithium ion secondary battery fabricated from the positive active material has improved energy density and an excellent cycle performance.

DETAILED DESCRIPTION OF EMBODIMENTS

Hereinafter, embodiments which specifically disclose a positive active material, a preparing method thereof, a positive plate, a negative plate, a secondary battery, a battery module, a battery pack and an electric device according to the present disclosure will be described in detail with reference to the accompanying drawings as appropriate. However, unnecessary detailed descriptions may be omitted in some cases. For example, detailed descriptions of well-known matters and repetitive descriptions of actually same structures may be omitted. This is for avoiding unnecessary and redundant description in the following, and facilitating the understanding of the person skilled in the art. Furthermore, the drawings and the following description are provided for those skilled in the art to fully understand the present disclosure, and are not intended to limit the subject matter recited in the claims.

REFERENCE NUMERALS

1 battery pack
2 upper box
3 lower box
4 battery module
5 secondary battery
51 housing
52 electrode assembly
53 top cover assembly For the sake of brevity, some numerical ranges are specifically disclosed herein. However, any lower limit may be combined with any upper limit to form ranges not explicitly recited; and any lower limit may be combined with any other lower limit to form a range not explicitly recited, and similarly, any upper limit may be combined with any other upper limit to form a range not explicitly recited. Furthermore, each separately disclosed point or individual value can serve as a lower limit or upper limit to be combined with any other point or individual value or with other lower limits or upper limits to form ranges not explicitly stated.

Currently, lithium iron phosphate is a most widely used positive active material of a lithium ion battery. Compared with a ternary material, the lithium iron phosphate has obvious advantages in safety performance, cycle performance and cost, and has large-scale disclosure to the fields of commercial vehicles, passenger vehicles and large-scale energy storage. However, a lithium ion secondary battery fabricated from the conventional lithium iron phosphate often has low energy density, and cannot meet requirements of some large-scale electric devices, such that higher requirements are put forward for a development of the lithium ion secondary battery based on the lithium iron phosphate.

The reason why the lithium ion secondary battery fabricated from the lithium iron phosphate has low energy density is as follows.

First, the lithium iron phosphate has poor electronic conductivity and ionic conductivity, thus limiting functions of its gram capacity. Compared with the ternary material, the lithium iron phosphate has poor ionic conductivity, and the electronic conductivity is about $10^{-9}$ S/cm, which is five orders of magnitude lower than that of the ternary material with a two-dimensional diffusion channel.

Second, nanocrystallization lithium iron phosphate results in low electrode plate compaction density. Currently, the poor electronic conductivity and ionic conductivity of the lithium iron phosphate are relieved by nanocrystallization of the lithium iron phosphate. However, the nanocrystallization lithium iron phosphate determines its lower space density, and then causes low powder and electrode plate compaction density, and finally causes low volume energy density of the secondary battery. Especially in a thick coating case, the electrode plate compaction density is typically 2.4 g/cm$^3$. Based on the above problem, after lots of research and experiments, the inventor of the present disclosure synthesizes a positive active material having a fast ion conductor layer of a NASICON structure and a carbon coating layer by modifying lithium iron phosphate, and further by regulating a carbon content and a specific surface area, defining a relationship between the specific surface area and the carbon content, regulating pH and a content of free lithium, and defining a relationship between the pH and the content of the free lithium, improves the ionic conductivity and electronic conductivity of lithium ions at a phase interface, and then improves the gram capacity of the lithium iron phosphate. In the present disclosure, a positive active material with high powder compaction density and high electrode plate compaction is obtained by improving particle size distribution of primary particles and increasing a particle size of the primary particles of the lithium iron phosphate, thus improving the energy density of the lithium ion secondary battery.

[Positive Active Material]

The positive active material according to the present disclosure includes a substrate and a coating layer, wherein the coating layer coats the substrate, and the coating layer includes a fast ion conductor layer and a carbon coating layer, the substrate includes more than one compound as shown in formula (I):

$$\text{LiFe}_{1-a}\text{M1}_a\text{PO}_4 \qquad \text{formula (I)},$$

in the formula (I), M1 is more than one selected from Cu, Mn, Cr, Zn, Pb, Ca, Co, Ni, Sr, Nb and Ti, and $0 \leq a \leq 0.01$, the fast ion conductor layer includes a fast ion conductor of a NASICON structure as shown in formula (II), $$\text{Li}_{3-b}\text{Fe}_{2-b}\text{M2}_b(\text{PO}_4)_3 \qquad \text{formula (II)},$$

in the formula (II), M2 is more than one selected from Ti, Zr, Hf, Ge and Sn with valence of +4, and $0 \leq b \leq 1$.

For a lithium ion secondary battery, the positive active material is a raw material providing lithium ions, and properties of the material and properties of a phase interface thereof in contact with an electrolyte solution directly affect extraction and insertion of the lithium ions, thus affecting energy density of the lithium ion secondary battery.

Lithium iron phosphate is a positive active material of the lithium ion secondary battery with a high safety performance, good structural stability and a low cost, but has a biggest defect that the corresponding lithium ion secondary battery has low energy density which is obviously lower than that of a ternary material. In view of the defect, in the present disclosure, the positive active material with a high gram capacity and high powder compaction density is developed and designed by modifying the lithium iron phosphate, and the thus fabricated lithium ion secondary battery has obviously improved energy density.

Figure 1:
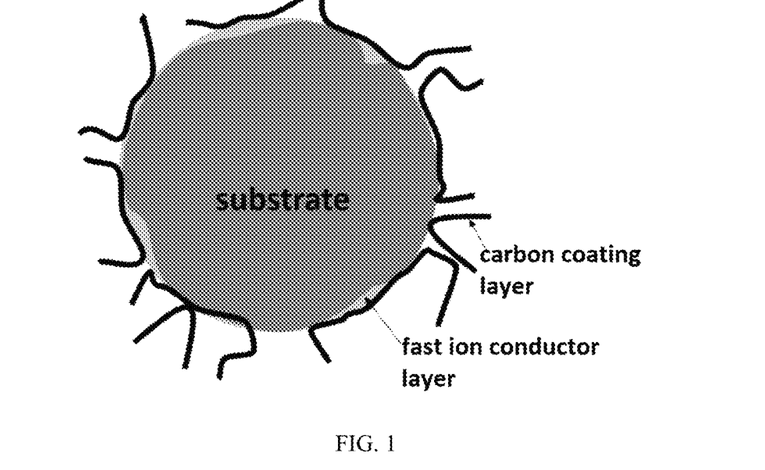
FIG. 1 is a schematic structural diagram of a positive active material according to an embodiment of the present disclosure.

Referring to FIG. 1, the positive active material according to the present disclosure has a coating structure in which the coating layer coats the substrate, and the coating layer coats the substrate.

The substrate includes LiFe$_{1-a}$M1$_a$PO$_4$, and optionally, M1 is more than one selected from Cu, Mn, Cr, Zn, Pb, Ca, Co, Ni, Sr, Nb and Ti, and optionally, $0 \leq a \leq 0.01$. The substrate is made of LiFe$_{1-a}$M1$_a$PO$_4$, such as LiFePO$_4$, thus fully utilizing the advantages of the lithium iron phosphate relative to the ternary material, improving the safety performance and a structural performance of the lithium ion secondary battery fabricated from the lithium iron phosphate, and reducing a synthesis cost of the lithium ion secondary battery.

The coating layer is provided for making up poor ionic conductivity and electronic conductivity of the lithium iron phosphate, and can obviously improve the ionic conductivity and electronic conductivity of the lithium iron phosphate, thereby improving the gram capacity of the lithium iron phosphate and then improving the energy density of the corresponding lithium ion secondary battery.

The coating layer includes the fast ion conductor layer, and specifically, the arrangement of the fast ion conductor layer makes the positive active material according to the present disclosure have following advantages.

The introduction of the fast ion conductor layer can improve transport rates at which the lithium ions are extracted/inserted many times at a positive terminal.

The fast ion conductor layer includes the fast ion conductor Li$_{3-b}$Fe$_{2-b}$M2$_b$(PO$_4$)$_3$ of a NASICON structure, and optionally, M2 is more than one selected from Ti, Zr, Hf, Ge and Sn with valence of +4, and optionally, $0 \leq b \leq 1$. The fast ion conductor Li$_{3-b}$Fe$_{2-b}$M2$_b$(PO$_4$)$_3$ of a NASICON structure is a material with an ultrafast ion conduction capability, has rich three-dimensional lithium ion diffusion and transport channels, and has advantages of a high ion conduction efficiency, a stable structure, or the like, in the process of plural times of lithium extraction/insertion. Therefore, coating of a surface of the lithium iron phosphate substrate with the fast ion conductor layer containing the fast ion conductor of a NASICON structure can remarkably increase the transport rates at which the lithium ions are extracted/inserted many times at the positive terminal, improve the ionic conductivity of the positive active material, then increase the gram capacity, and further improve the energy density of the corresponding lithium ion secondary battery.

In some embodiments, the above fast ion conductor of a NASICON structure may be Li$_2$FeTi(PO$_4$)$_3$, Li$_2$FeZr(PO$_4$)$_3$, Li$_2$FeSn(PO$_4$)$_3$, or a combination of any two or three thereof.

The coating layer further includes the carbon coating layer, and optionally, the carbon coating layer may be formed by coating a surface of the fast ion conductor layer with an organic carbon source, such as glucose, polyethylene glycol, or the like, using a carbonization process. The carbon coating layer may partially or completely coat the fast ion conductor layer. The arrangement of the carbon coating layer can obviously improve the electronic conductivity of the lithium iron phosphate, make up the defect of the poor electronic conductivity of the lithium iron phosphate and improve the energy density of the lithium ion secondary battery.

Specifically, the arrangement of the carbon coating layer makes the positive active material according to the present disclosure have following advantages.

The carbon coating layer in the positive active material according to the present disclosure provides a proper channel for transport of electrons, can obviously increase the conduction rates of the electrons during plural times of lithium extraction/insertion, improves the electronic conductivity of the lithium iron phosphate, and improves the energy density of the corresponding lithium ion secondary battery.

The carbon coating layer of the positive active material according to the present disclosure is loose and porous, such that the electrolyte solution can be in full and effective contact with the lithium iron phosphate substrate, thereby increasing the transport rate of the lithium ions at the phase interface, and improving the energy density of the lithium ion secondary battery.

Coating of the surface of the lithium iron phosphate substrate with the carbon coating layer can also improve the structural stability of the positive active material, and effectively prevent an iron dissolution phenomenon of the positive active material in long-term storage and cycle use processes of the lithium ion secondary battery, thereby guaranteeing a cycle life of the lithium ion secondary battery.

With the lithium iron phosphate as a base material, the positive active material according to the present disclosure fully exerts the advantages of the low cost, high safety performance and good cycle stability of the lithium iron phosphate, and meanwhile, the coating layer (the fast ion conductor layer and the carbon coating layer) is used to solve the defects of the poor electronic conductivity and ionic conductivity of the lithium iron phosphate. The lithium ion secondary battery fabricated from the positive active material according to the present disclosure has significantly improved energy density on the premise of having an excellent cycle performance.

In some embodiments, optionally, in the positive active material, molar weights of the $LiFe_{1-a}M1_aPO_4$ and the $Li_{3-b}Fe_{2-b}M2_b(PO_4)_3$ have a ratio of $(1-x):x$, and $0<x\leq0.005$.

After lots of experiments and research, the inventor finds that, in the positive active material according to the present disclosure, a molar weight x of the fast ion conductor of a NASICON structure has a great influence on the gram capacity of the positive active material. Introduction of a proper quantity of the fast ion conductor of a NASICON structure into the lithium iron phosphate can effectively solve the problem of the poor ionic conductivity, improve the gram capacity of the lithium iron phosphate, and improve the energy density of the corresponding lithium ion secondary battery. A theoretical gram capacity of the fast ion conductor is not high, and a further increase of the content thereof in an appropriate range cannot further improve the gram capacity.

In some embodiments, x may be 0.001, 0.002, 0.003 or 0.005, or a numerical value of x is within a range obtained by combining any two above-mentioned numerical values.

In some embodiments, carbon has a mass percentage content C % of 1%-1.5% in the positive active material, the positive active material has a specific surface area S of 10 $m^2/g$-15 $m^2/g$, and a ratio of the specific surface area S to the mass percentage content C % of the carbon of the positive active material satisfies $9\leq S/C\leq 12$.

The carbon coating layer is an important component for improving the overall electronic conductivity of the positive active material according to the present disclosure.

On the one hand, the carbon coating layer is loose and porous, such that the electrolyte solution can be in full and effective contact with the lithium iron phosphate substrate, transport of the lithium ions at the phase interface is guaranteed, and the energy density of the lithium ion secondary battery is improved. On the other hand, the appropriate carbon content (1%-1.5%) can obviously improve the electronic conductivity of the positive active material, so as to improve the energy density of the lithium ion secondary battery. However, carbon is an inactive substance, and when a carbon coating amount is over large, an active substance content is decreased, thus reducing the total gram capacity of the positive active material.

The loose and porous carbon coating layer is a main contributor of the specific surface area of the positive active material according to the present disclosure. The specific surface area (10 $m^2/g$-15 $m^2/g$) of the positive active material within a proper range is beneficial to improving a contact area between the electrolyte solution and the positive active material, improving reaction dynamics of the battery and improving the energy density of the battery.

However, an excessively large specific surface area of the positive active material may affect processability of slurry prepared therefrom; for example, a slurry solid content is difficult to increase, and coating is prone to crack. An excessively large specific surface of the positive active material may also cause a large water absorption amount of the positive active material, and an electrode plate has a high residual water content under a same baking condition, which finally affects the cycle performance of the lithium ion secondary battery.

An excessively small specific surface area of the positive active material indicates that the carbon coating layer has an excessively low specific surface contribution, which indicates that the carbon coating layer is not loose and porous enough at this point, and therefore, extraction/insertion of the lithium ions is not facilitated, thereby influencing the energy density and the cycle performance of the battery.

From the above discussion, the carbon content C % in the positive active material affects the specific surface S of the positive active material, and a change in the specific surface S of the positive active material is mainly affected by the carbon content, and both parameters affect the gram capacity of the positive active material and the cycle performance of the lithium ion secondary battery. After lots of experiments and research, the inventor finds that the ratio S/C of the carbon content to the specific surface area of the positive active material according to the present disclosure greatly influences the gram capacity of the positive active material and the cycle performance of the lithium ion secondary battery.

Although a detailed mechanism is still unclear, the ratio S/C of the carbon content and the specific surface area of the positive active material can be interpreted as a specific surface area of the positive active material per carbon content in a physical sense. The ratio can reflect both a loose degree and coating integrity of the carbon coating layer of the positive active material according to the present disclosure. Specifically, under a condition of basically consistent powder compaction density, the larger the ratio S/C of the mass percentage content of the carbon in the positive active material to the specific surface area of the positive active material is, the higher a gram capacity of a button cell is, and the larger the energy density of the corresponding lithium ion secondary battery is, but when the mass percentage content of the carbon in the positive active material and the specific surface area of the positive active material have an over large ratio S/C, the cycle life of the corresponding lithium ion secondary battery may be affected.

In some embodiments, the ratio S/C of the carbon content to the specific surface area of the positive active material may be 9.53, 10.15 or 11.67, or a value thereof is within a range obtained by combining any two above-mentioned numerical values.

In some embodiments, free lithium is present in the positive active material.

In some embodiments, the positive active material has pH not less than 9.

The free lithium in the present disclosure is inactive free lithium which cannot be inserted into/extracted from the positive active material, is unavoidable in a process of synthesizing the lithium-iron-phosphate positive active material, generally exists in a form of lithium phosphate, or the like, outside a bulk phase structure of the lithium iron phosphate substrate, and is different from active lithium located in a bulk phase structure of the lithium iron phosphate substrate.

The existence of the ion conductor layer with the fast ion conductor of a NASICON structure accelerates dissolution of the active lithium in the bulk phase structure of the lithium iron phosphate substrate in the present disclosure, such that the positive active material according to the present disclosure has a pH value higher than that of the lithium iron phosphate only coated with carbon but not containing the fast ion conductor layer.

In some embodiments, free lithium is present in the positive active material, and the pH of the positive active material and a mass percentage content $N_{Li+}$% of the free lithium satisfy $0.15 \le pH-(36N_{Li+}+8) \le 1.1$. The pH is the pH of the above positive active material.

Although a mechanism is still unclear, after lots of experiments and research of the inventor, $pH-(36N_{Li+}+8)$ is in positive correlation with dissolution of the active lithium in the bulk phase structure of the lithium iron phosphate substrate, and the larger a value of $pH-(36N_{Li+}+8)$ is, the higher a capability of transport of the active lithium in the bulk phase structure of the lithium iron phosphate substrate to a surrounding solution is, that is, the better a transport performance of lithium ions at the phase interface between the positive active material according to the present disclosure and the electrolyte solution is, which indicates that the active lithium in the bulk phase structure of the lithium iron phosphate substrate is more easily dissolved due to the introduction of the NASICON type fast ion conductor. When the numerical value of $pH-(36N_{Li+}+8)$ is within a reasonable range ($0.15 \le pH-(36N_{Li+}+8) \le 1.1$), the corresponding positive active material has an excellent gram capacity and an excellent cycle performance.

Specifically, the content of the free lithium in the positive active material according to the present disclosure has a test process of adding 30 g of the positive active material into 100 mL of water, stirring the mixture for 30 min, filtering the mixture, taking 25 mL of filtrate, dropwise adding dilute hydrochloric acid with a concentration of 0.1 mol/L into the filtrate, and recording a change curve of pH of the filtrate with an addition amount of the dilute acid. An abrupt change point may appear in the curve within the pH range of 4-5.5 of the filtrate, and an addition volume V of the dilute hydrochloric acid at the abrupt change point is recorded, such that the content of the free lithium in the positive active material may be calculated by the following formula:

$$N_{Li+}\% = C \times V \times 4 \times 6.941/30 \times 100\%.$$

Although a mechanism is still unclear, after lots of experiments and research, the inventor finds that the $pH-(36N_{Li+}+8)$ can reflect a positive effect of the introduction of the NASICON type fast ion conductor on promotion of the dissolution of the active lithium in the positive active material in a physical sense, and the numerical value of the $pH-(36N_{Li+}+8)$ has a remarkable influence on the gram capacity and cycle performance of the corresponding lithium ion secondary battery.

Specifically, $pH-(36N_{Li+}+8)$ is in positive correlation with the dissolution of the active lithium in the bulk phase structure, and the larger the value of $pH-(36N_{Li+}+8)$ is, the higher the capability of transport of the active lithium in the bulk phase structure of the positive active material to the surrounding solution is, that is, the better the transport performance of the lithium ions at the phase interface is, which indicates that the active lithium in the bulk phase structure of the positive active material is more easily dissolved due to the introduction of the NASICON type fast ion conductor. However, an over large value of $pH-(36N_{Li+}+8)$ indicates dissolution of excessive active lithium in the bulk phase structure of the positive active material, which indirectly reflects poor structural stability of the lithium iron phosphate substrate used for supplying the active lithium at this point, thereby affecting the cycle performance of the corresponding lithium ion secondary battery.

Secondly, $pH-(36N_{Li+}+8)$ can also reflect the coating integrity of the carbon coating layer. Under a condition of a constant content of the NASICON type fast ion conductor, a large value (greater than 1.1) of $pH-(36N_{Li+}+8)$ indicates poor carbon coating, thus affecting the cycle performance of the lithium ion secondary battery. On the contrary, when $pH-(36N_{Li+}+8)$ has a small value (lower than 0.15), S/C has a small value, which indicates compact carbon coating indicating good coating integrity of the carbon coating layer.

In some embodiments, the value of $pH-(36N_{Li+}+8)$ may be 0.18, 0.41, 0.53, 1.04 or 1.06, or a numerical value thereof is within a range obtained by combining any two above-mentioned numerical values.

In some embodiments, the positive active material has a volume average particle size satisfying $1~\mu m \le Dv50 \le 2~\mu m$ and $0.4~\mu m \le Dv10 \le 0.7~\mu m$.

In the present disclosure, Dv10 is a particle size (in μm) corresponding to a cumulative volume distribution percentage of the positive active material of 10%; Dv50 is a particle size (in μm) corresponding to the cumulative volume distribution percentage of the positive active material of 50%. After lots of research and experiments, the inventor finds that when the volume average particle size of the positive active material satisfies $1~\mu m \le Dv50 \le 2~\mu m$ and $0.4~\mu m \le Dv10 \le 0.7~\mu m$, the positive active material has reasonable overall particle size distribution, which is beneficial to improving the powder compaction density of the positive active material, improving the electrode plate compaction density of the positive plate, and then improving the energy density of the lithium ion secondary battery. The powder compaction density of the positive active material according to the present disclosure is related to the particle size distribution of the positive active material and a particle size of primary particles, and the reasonable particle size distribution of the positive active material and the larger particle size of the primary particles are beneficial to improving the powder compaction density of the positive active material.

Specifically, when the positive active material has large Dv50 (exceeding 2 μm), or when Dv10 is lower than 0.4 μm or higher than 0.7 μm, the positive active material has unreasonable particle size distribution, thereby reducing the powder compaction density of the positive active material, and then reducing the electrode plate compaction density.

In some embodiments, Dv50 may be 1.2, 1.3, 1.4, 1.6, 1.7 or 1.8, or a numerical value thereof is within a range obtained by combining any two above-mentioned numerical values.

In some embodiments, Dv10 may be 0.43, 0.47, 0.49, 0.51, 0.52, 0.54, 0.55, 0.56, 0.58 or 0.61, or a numerical value thereof is within a range obtained by combining any two above-mentioned numerical values.

In some embodiments, the positive active material is primary particles or a pseudo-single crystal.

Figure 2:
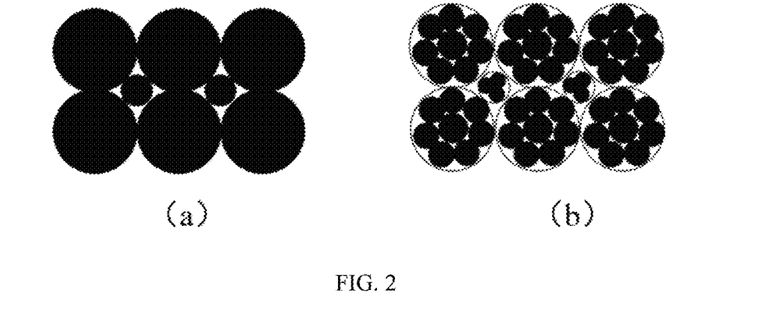
FIG. 2 is a schematic diagram of influences of different particle sizes of primary particles on powder compaction density according to an embodiment of the present disclosure.

An increase of the particle size of the primary particles of the positive active material is another way to improve the powder compaction density of the positive active material. Under a condition of similar particle size distribution, the larger the particle size of the primary particles of the positive active material is, the larger the powder compaction density is. As shown in FIG. 2, the black disks in FIGS. 2(a) and 2(b) represent primary particles, and the positive active materials in FIGS. 2(a) and 2(b) have similar entire particle size distribution, but the primary particles in FIG. 2(a) have a larger particle size, and therefore, the powder compaction density is higher (more voids exist in FIG. 2(b)).

Compared with lithium iron phosphate only coated with carbon, the positive active material according to the present disclosure is primary particles or a pseudo-single crystal, has a large primary particle size, and thus achieves improved powder compaction density and electrode plate compaction density, which is beneficial to improving the energy density of the corresponding lithium ion secondary battery.

In some embodiments, the positive active material has powder compaction density $\rho \geq 2.5$ g/cm$^3$.

When the positive active material has high powder compaction density, the positive plate fabricated from the positive active material has high compaction density, and the corresponding lithium ion secondary battery has high energy density. In some embodiments, a value of the powder compaction density p of the positive active material may be 2.53, 2.54, 2.55, 2.56, 2.57 or 2.59, or a numerical value thereof is within a range obtained by combining any two above-mentioned numerical values.

In some embodiments, the positive active material has powder resistivity $R \leq 11$ Ω·cm.

Compared with lithium iron phosphate (resistivity thereof exceeds 2 E$^5$) not coated with carbon, the positive active material according to the present disclosure has obviously reduced powder resistivity, which indicates that resistance of the positive active material can be obviously reduced by the arrangement of the carbon coating layer. However, when the positive active material has powder resistivity R exceeding 11 Ω·cm, for example, when R is 18.7 Ω·cm, the gram capacity of the positive active material is lowered to a certain extent.

In some embodiments, a value of the powder resistivity R of the positive active material may be 3.5, 4.3, 2.7, 8.7 or 9.8, or a numerical value thereof is within a range obtained by combining any two above-mentioned numerical values.

One embodiment of the present disclosure provides a lithium ion secondary battery.

Usually, the lithium ion secondary battery includes a positive plate, a negative plate, an electrolyte, and a separator. During charging and discharging processes of the battery, active ions are inserted and extracted back and forth between the positive plate and the negative plate. The electrolyte plays a role of conducting ions between the positive plate and the negative plate. The separator is provided between a positive plate and a negative plate, mainly functions to prevent a short circuit of the positive electrode and the negative electrode, and meanwhile may allow the ions to pass.

[Positive Plate]

The present disclosure provides a positive plate, including the positive active material according to the present disclosure.

The positive plate according to the present disclosure has excellent electrode plate compaction density and gram capacity due to inclusion of the positive active material with the NASICON fast ion conductor layer and the carbon coating layer, and is beneficial to improving the energy density of the lithium ion secondary battery.

The positive plate includes a positive current collector and a positive film layer provided on at least one surface of the positive current collector, the positive film layer including the positive active material according to the first aspect of the present disclosure.

Figure 3:
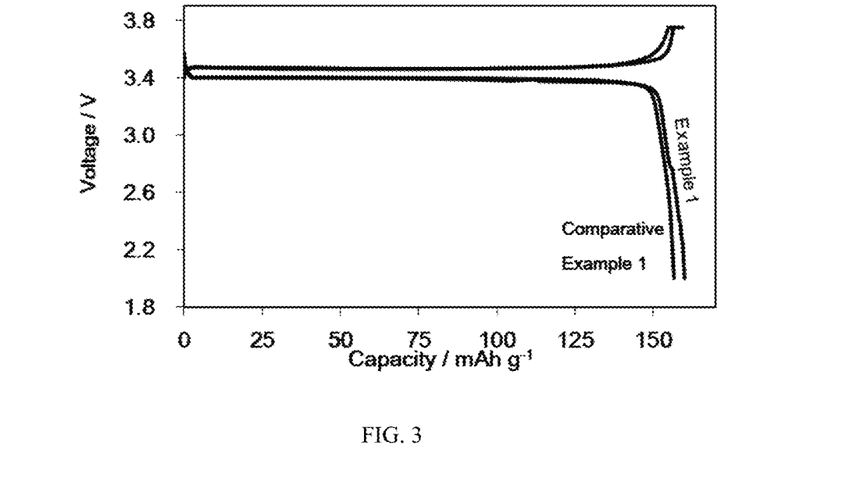
FIG. 3 shows 0.1 C charging-discharging curves of button cells corresponding to positive active materials of Example 1 and Comparative Example 1 of the present disclosure.
Figure 4:
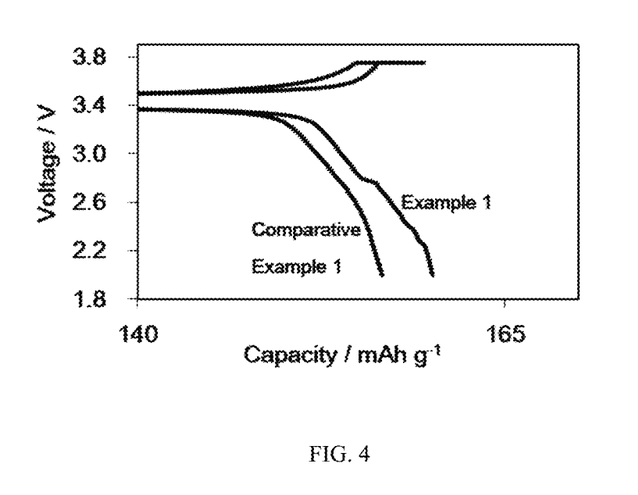
FIG. 4 shows charging-discharging curves of the button cells corresponding to the positive active materials of Example 1 and Comparative Example 1 of the present disclosure within a voltage range of 2.5-2.9V vs Li$^+$.

In some embodiments, referring to FIGS. 3 and 4, in a 0.1 C charging-discharging curve of a button cell fabricated from the positive active material according to the first aspect of the present disclosure, a charging-discharging platform exists within a voltage range of 2.5-2.9V vs Li+, and the platform can prove the existence of the NASICON fast ion conductor contained in the positive active material according to the present disclosure.

As an example, the positive current collector has two surfaces opposite in a thickness direction thereof, and the positive film layer is provided on one or both of the two opposite surfaces of the positive current collector.

In the lithium ion secondary battery according to the present disclosure, metal foil or a composite current collector may be used as the positive current collector. For example, aluminum foil may be used as the metal foil. The composite current collector may include a high molecular material base layer and a metal layer formed on at least one surface of the high molecular material base layer. The composite current collector may be formed by forming a metal material (aluminum, an aluminum alloy, nickel, a nickel alloy, titanium, a titanium alloy, silver, a silver alloy, or the like) on the base layer of high molecular material (such as polypropylene (PP), polyethylene terephthalate (PET), polybutylene terephthalate (PBT), polystyrene (PS), polyethylene (PE), or the like).

The positive film layer further in some embodiments includes a conductive agent. A type of the conductive agent is not particularly limited and may be selected by those skilled in the art according to actual requirements. As an example, the conductive agent for the positive film layer may be more than one of superconducting carbon, acetylene black, carbon black, Ketjen black, carbon dots, carbon nanotubes, graphene, and carbon nanofibers.

The positive plate may be fabricated according to a method known in the art in the present disclosure. As an example, the positive active material according to the present disclosure, the conductive agent and a binder may be dispersed in a solvent (for example, N-methyl pyrrolidone (NMP)) to form even positive slurry; the positive current collector is coated with the positive slurry, and drying, cold pressing and other processes are performed to obtain the positive plate.

[Negative Plate]

The negative plate includes a negative current collector and a negative film provided on at least one surface of the negative current collector, the negative film including a negative active material.

As an example, the negative current collector has two surfaces opposite in a thickness direction thereof, and the negative film is provided on one or both of the two opposite surfaces of the negative current collector.

In the lithium ion secondary battery according to the present disclosure, metal foil or a composite current collector may be used as the negative current collector. For example, copper foil may be used as the metal foil. The composite current collector may include a high molecular material base layer and a metal layer formed on at least one surface of the high molecular material base layer. The composite current collector may be formed by forming a metal material (copper, a copper alloy, nickel, a nickel alloy, titanium, a titanium alloy, silver, a silver alloy, or the like) on the base layer of high molecular material (such as polypropylene (PP), polyethylene terephthalate (PET), polybutylene terephthalate (PBT), polystyrene (PS), polyethylene (PE), or the like).

In the lithium ion secondary battery according to the present disclosure, the negative film usually contains a negative active material, an optional binder, an optional conductive agent, and other optional additives, and is generally formed by coating and drying of negative slurry. The negative slurry is generally formed by dispersing the negative active material, the optional conductive agent and binder, or the like, in a solvent and stirring the mixture to be even. The solvent may be N-methyl pyrrolidone (NMP) or deionized water.

As an example, the conductive agent may be more than one of superconducting carbon, acetylene black, carbon black, Ketjen black, carbon dots, carbon nanotubes, graphene, and carbon nanofibers.

As an example, the binder may be more than one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

The other optional additives are, for example, a thickener (for example, sodium carboxymethyl cellulose (CMC-Na)), or the like.

In the lithium ion secondary battery according to the present disclosure, in addition to the negative active material, the negative film may in some embodiments include other common negative active materials, for example, artificial graphite, natural graphite, soft carbon, hard carbon, silicon substrate materials, tin substrate materials, lithium titanate, or the like. The silicon substrate material may be more than one of elemental silicon, a silicon-oxygen compound, a silicon-carbon composite, a silicon-nitrogen composite, and a silicon alloy. The tin substrate material may be more than one of elemental tin, a tin-oxide compound, and a tin alloy.

[Electrolyte]

The electrolyte plays a role of conducting ions between the positive plate and the negative plate. A type of the electrolyte is not particularly limited in the present disclosure and may be selected as desired. For example, the electrolyte may be at least one of a solid electrolyte and a liquid electrolyte (i.e., an electrolytic solution).

In some embodiments, the electrolyte is an electrolyte solution. The electrolyte includes electrolyte salt and a solvent.

In some embodiments, the electrolyte salt may be more than one of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bis-fluorosulfonylimide), LiTFSI (lithium bis-trifluoromethanesulfonylimide), LiTFS (lithium trifluoromethanesulfonate), LiDFOB (lithium difluoro(oxalato)borate), LiBOB (lithium bis(oxalate)borate), $LiPO_2F_2$ (lithium difluorophosphate), LiDFOP (lithium difluorobisoxalate phosphate), and LiTFOP (lithium tetrafluorooxalato phosphate).

In some embodiments, the solvent may be more than one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), ethyl methyl sulfone (EMS), and diethyl sulfone (ESE).

In some embodiments, the electrolyte further in some embodiments includes an additive. For example, the additive may include a negative film formation additive or a positive film layer formation additive, and may further include an additive capable of improving certain performances of the battery, such as an additive for improving an overcharge performance of the battery, an additive for improving a high-temperature performance of the battery, an additive for improving a low-temperature performance of the battery, or the like.

[Separator]

The lithium ion secondary battery with the electrolytic solution and some lithium ion secondary batteries with solid electrolytes further include separators. The separator is provided between the positive plate and the negative plate to play an isolating role. A type of the separator is not particularly limited in the present disclosure, and any well-known separator with a porous structure having good chemical stability and mechanical stability may be selected. In some embodiments, the separator may be made of more than one of glass fibers, non-woven fabrics, polyethylene, polypropylene and polyvinylidene difluoride. The separator may be a single-layer film or a multi-layer composite film, which is not particularly limited. When the separator is a multi-layer composite film, respective layers may be made of same or different materials, which is not particularly limited.

In some embodiments, the positive plate, the negative plate and the separator may be manufactured into an electrode assembly with a winding process or a lamination process.

In some embodiments, the lithium ion secondary battery may include an outer package. The outer package may be configured to encapsulate the electrode assembly and the electrolyte.

In some embodiments, the outer package of the lithium ion secondary battery may be a hard shell, such as a hard plastic shell, an aluminum shell, a steel shell, or the like. The outer package of the secondary battery may also be a soft package, such as a bag-type soft package. The soft package may be made of plastic, such as polypropylene (PP), polybutylene terephthalate (PBT), polybutylene succinate (PBS), or the like.

Figure 5:
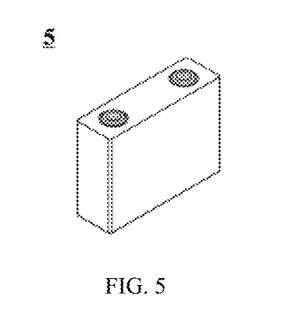
FIG. 5 is a schematic diagram of a lithium ion secondary battery according to an embodiment of the present disclosure.

A shape of the lithium ion secondary battery is not particularly limited in the present disclosure, and may be a cylindrical shape, a square shape, or any other shape. For example, FIG. 5 shows a lithium ion secondary battery 5 of a square structure as an example.

Figure 6:
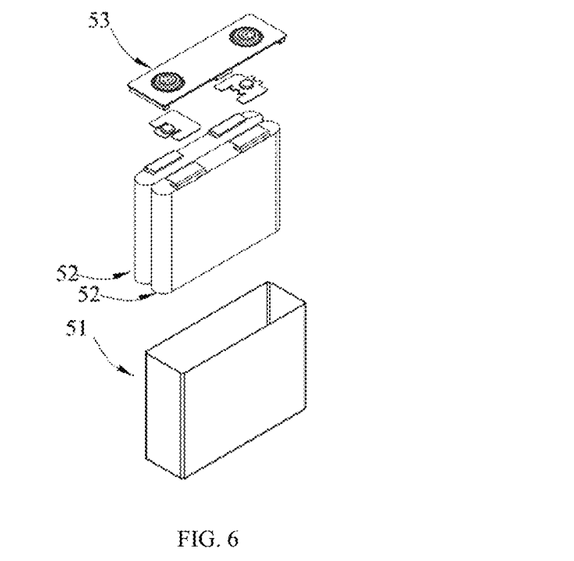
FIG. 6 is an exploded view of the secondary battery according to the embodiment of the present disclosure shown in FIG. 5.

In some embodiments, referring to FIG. 6, the outer package may include a housing 51 and a cover plate 53. The housing 51 may include a bottom plate and a side plate connected to the bottom plate, and the bottom plate and the side plate enclose an accommodating cavity. The housing 51 has an opening communicated with the accommodating cavity, and the cover plate 53 may cover the opening to close the accommodating cavity. The positive plate, the negative plate and the separator may form the electrode assembly 52 with a winding process or a lamination process. The electrode assembly 52 is encapsulated within the accommodating cavity. The electrolyte immerses the electrode assembly 52. One or more electrode assemblies 52 may be contained in the secondary battery 5, and those skilled in the art may make a choice according to specific practical requirements.

[Battery Module]

In some embodiments, the secondary batteries may be assembled into a battery module, one or more secondary batteries may be contained in the battery module, and the specific number may be selected by those skilled in the art according to an disclosure and a capacity of the battery module.

Figure 7:
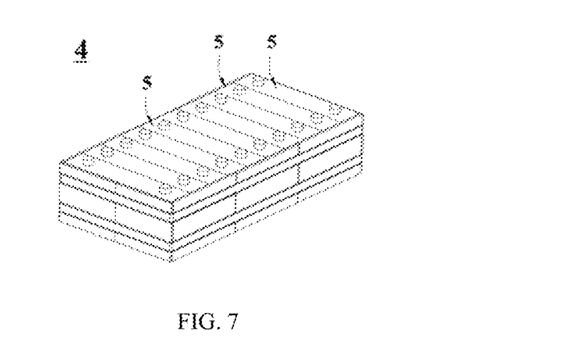
FIG. 7 is a schematic diagram of a battery module according to an embodiment of the present disclosure.

FIG. 7 shows a battery module 4 as an example. Referring to FIG. 7, a plurality of secondary batteries 5 may be sequentially arranged in the battery module 4 in a length direction of the battery module 4. Certainly, the secondary batteries 5 may be arranged in any other way. The plurality of secondary batteries 5 may be further fixed by fasteners.

In some embodiments, the battery module 4 may further include a casing having an accommodating space in which the plurality of secondary batteries 5 are accommodated.

[Battery Pack]

In some embodiments, the above-mentioned battery modules may be further assembled into a battery pack, and the number of the battery modules contained in the battery pack may be selected by those skilled in the art according to an disclosure and a capacity of the battery pack.

Figure 8:
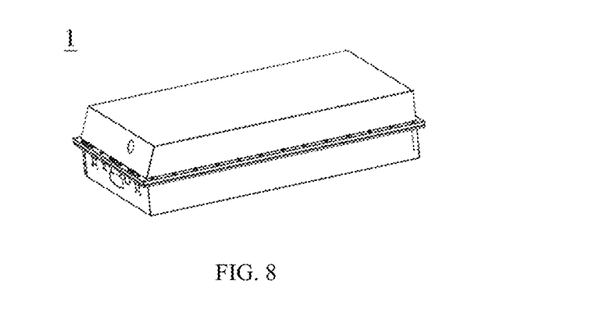
FIG. 8 is a schematic diagram of a battery pack according to an embodiment of the present disclosure.
Figure 9:
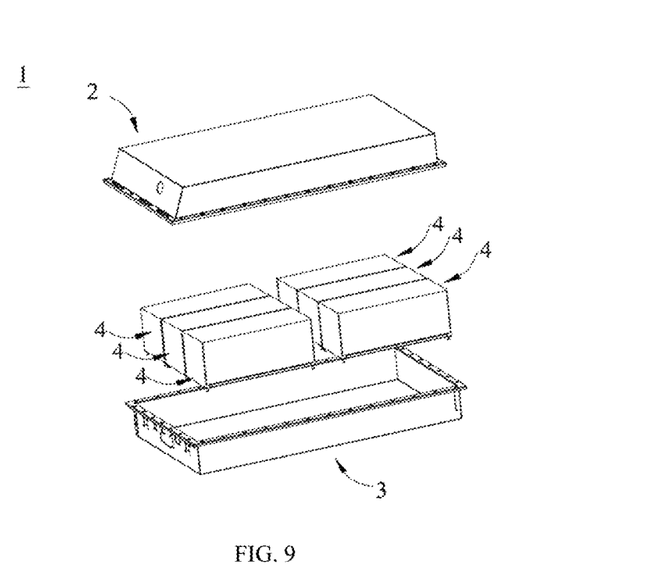
FIG. 9 is an exploded view of the battery pack according to the embodiment of the present disclosure shown in FIG. 8.

FIGS. 8 and 9 show a battery pack 1 as an example. Referring to FIGS. 8 and 9, the battery pack 1 may include a battery box and a plurality of battery modules 4 arranged in the battery box. The battery box includes an upper box 2 and a lower box 3, and the upper box 2 may cover the lower box 3 to form an enclosed space for accommodating the battery module 4. The plurality of battery modules 4 may be arranged in the battery box in any manner.

[Electric Device]

In addition, the present disclosure further provides an electric device, including more than one of the lithium ion secondary battery, the battery module and the battery pack according to the present disclosure. The lithium ion secondary battery, the battery module, or the battery pack may be used as a power source or an energy storage unit of the electric device. The electric device may be, but is not limited to, a mobile apparatus (for example, a mobile phone, a notebook computer, or the like), an electric vehicle (for example, a battery electric vehicle, a hybrid electric vehicle, a plug-in hybrid electric vehicle, an electric bicycle, an electric scooter, an electric golf cart, an electric truck, or the like), an electric train, a ship, a satellite, an energy storage system, or the like.

The lithium ion secondary battery, the battery module, or the battery pack may be selected according to use requirements of the electric device.

Figure 10:
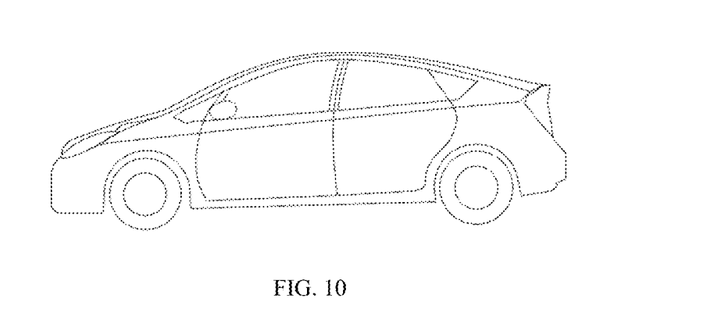
FIG. 10 is a schematic diagram of an electric device according to an embodiment of the present disclosure.

FIG. 10 shows an electric device as an example. The electric device may be a battery electric vehicle, a hybrid electric vehicle, a plug-in hybrid electric vehicle, or the like. In order to meet demands of the device for high power and high energy density of the lithium ion secondary battery, a battery pack or a battery module may be used.

As another example, the electric device may be a mobile phone, a tablet computer, a notebook computer, or the like. Usually, the electric device is required to be thin and light, and a lithium ion secondary battery may be used as the power source thereof.

EXAMPLE

Hereinafter, examples of the present disclosure will be described. The examples described below are illustrative, and merely used to explain the present disclosure. The examples shall not be construed to limit the present disclosure. If the specific technologies or conditions are not specified in the examples, a step will be performed in accordance with the techniques or conditions described in the literature in the art or in accordance with the product instructions. The reagents or instruments used in the present invention, the manufacturers of which are not indicated, are the commercially available conventional products.

Example 1

Preparation of Positive Active Material

Ferrous oxalate, lithium dihydrogen phosphate and titanium oxide were used as raw materials and mixed according to a molar ratio of 1:1.04:0.003, glucose and polyethylene glycol as carbon sources were added according to a mass ratio of 1:1, and the carbon source accounted for 20% of a total weight of the solid raw materials. Deionized water was added into the solid raw material according to a ratio of the solid raw material to the water of 1:1, and wet grinding was performed to obtain ground slurry. Spray drying was performed on the obtained slurry, the slurry was then placed into a roller furnace to be sintered for 24 hours at 780° C., and nitrogen was introduced in the sintering process. After sintering, the material was naturally cooled to a temperature lower than 80° C. and discharged to obtain a calcined material. The calcined material was crushed, sieved, demagnetized, and then subjected to vacuum packaging to obtain the positive active material of Example 1 of the present disclosure.

[Fabrication of Positive Plate]

The above obtained positive active material, a binder (polyvinylidene fluoride (PVDF)) and a conductive agent (acetylene black) were mixed according to a mass ratio of 96.5:2.0:1.5, a proper quantity of solvents (N-methyl pyrrolidone (NMP)) were added, and the mixture was fully stirred and mixed to form uniform positive slurry. Carbon-coated aluminum foil with a positive current collector having a thickness of 13 μm was coated with the slurry at coating surface density of 26 mg/cm$^2$. Then, drying, cold pressing and splitting were performed to obtain the positive plate.

[Fabrication of Negative Plate]

A negative active material (graphite), a thickener (sodium carboxymethyl cellulose), a binder (styrene butadiene rubber) and a conductive agent (acetylene black) were mixed according to a mass ratio of 97:1:1:1, deionized water was added, and negative slurry was obtained under the action of a vacuum stirrer. Copper foil with a thickness of 8 μm was evenly coated with the negative slurry. Then, drying, cold pressing and splitting were performed to obtain the negative plate.

Preparation of Electrolyte Solution

Ethylene carbonate, ethyl methyl carbonate and diethyl carbonate were prepared into a mixed solution according to a volume ratio of 20:20:60, fully dried lithium salt was then dissolved into the mixed solution, 10 wt % of an additive (fluoroethylene carbonate) was added, and the mixture was mixed to be even to obtain the electrolyte solution. The lithium salt had a concentration of 1 mol/L. The whole operation process was performed in an argon atmosphere glove box with a water content less than 10 ppm.

[Separator]

A polyethylene film with a thickness of 12 μm was used as the separator.

Example 2

Other steps of Example 2 were the same as those of Example 1 except that the titanium oxide was replaced with zirconium oxide in the section [Preparation of positive active material].

Example 3

Other steps of Example 3 were the same as those of Example 1 except that the titanium oxide was replaced with tin oxide in the section [Preparation of positive active material].

Example 4

Other steps of Example 4 were the same as those of Example 1 except that the mass ratio of the added glucose to polyethylene glycol was changed to 7:3 in the section [Preparation of positive active material].

Example 5

Other steps of Example 4 were the same as those of Example 1 except that the mass ratio of the added glucose to polyethylene glycol was changed to 3:7 in the section [Preparation of positive active material].

Example 6

Other steps of Example 6 were the same as those of Example 1 except that the molar ratio of the fed ferrous oxalate, lithium dihydrogen phosphate and titanium oxide was changed to 1:1.04:0.002 in the section [Preparation of positive active material].

Example 7

Other steps of Example 7 were the same as those of Example 1 except that the molar ratio of the fed ferrous oxalate, lithium dihydrogen phosphate and titanium oxide was changed to 1:1.04:0.001 in the section [Preparation of positive active material].

Example 8

Other steps of Example 8 were the same as those of Example 1 except that the molar ratio of the fed ferrous oxalate, lithium dihydrogen phosphate and titanium oxide was changed to 1:1.04:0.01 in the section [Preparation of positive active material].

Example 9

Other steps of Example 9 were the same as those of Example 1 except that the carbon sources were all replaced with glucose in the section [Preparation of positive active material].

Example 10

Ferrous oxalate, lithium dihydrogen phosphate and titanium oxide were used as raw materials and mixed according to a molar ratio of 1:1.04:0.003, glucose and polyethylene glycol as carbon sources were added according to a mass ratio of 1:1, and the carbon source accounted for 15% of a total weight of the solid raw materials. Deionized water was added into the solid raw material according to a ratio of the solid raw material to the water of 1:1, and wet grinding was performed to obtain ground slurry. Spray drying was performed on the obtained slurry, the slurry was then placed into a roller furnace to be sintered for 24 hours at 780° C., and nitrogen was introduced in the sintering process. After sintering, the material was naturally cooled to a temperature lower than 80° C. and discharged to obtain a calcined material. After the calcined material was crushed, a compact carbon coating layer was deposited on a surface of the crushed calcined material using a chemical vapor deposition (CVD) method (a carbon source used by the CVD method was ethylene, and the carbon source and the crushed material had a ratio of 1:20), and then, sieving and demagnetization were performed to obtain the positive active material of Example 10 of the present disclosure.

Example 11

In the section [Preparation of positive active material], in Example 13, the calcined material was placed into a jet mill, and Dv50 and Dv10 of the positive active material were large by adjusting a rotation speed of a grading wheel for crushing.

Other steps of Example 11 were the same as those of Example 1.

Example 12

Other steps of Example 12 were the same as those of Example 1 except that the molar ratio of the fed ferrous oxalate, lithium dihydrogen phosphate and titanium oxide was changed to 1:1.04:0.005 in the section [Preparation of positive active material].

Example 13

In the section [Preparation of positive active material], a sintering temperature of Example 13 was 760° C., and other steps of Example 13 were the same as those of Example 1.

Comparative Example 1

Iron phosphate and lithium carbonate were used as raw materials and mixed according to a molar ratio of 1:1.04, glucose and polyethylene glycol as carbon sources were added according to a mass ratio of 1:1, and the carbon source accounted for 20% of a total weight of the solid raw materials. Deionized water was added into the solid raw material according to a ratio of the solid raw material to the water of 1:1, and wet grinding was performed to obtain ground slurry. Spray drying was performed on the obtained slurry, the slurry was then placed into a roller furnace to be sintered for 24 hours at 780° C., and nitrogen was introduced in the sintering process. After sintering, the material was naturally cooled to a temperature lower than 80° C. and discharged to obtain a calcined material. The calcined material was crushed, sieved, demagnetized, and then subjected to vacuum packaging to obtain the positive active material of Comparative Example 1 of the present disclosure.

Comparative Example 2

Iron phosphate and lithium carbonate were used as raw materials and mixed according to a molar ratio of 1:1.04, deionized water was added into the solid raw material according to a ratio of the solid raw material to the water of 1:1, and wet grinding was performed to obtain ground slurry. Spray drying was performed on the obtained slurry, the slurry was then placed into a roller furnace to be sintered for 24 hours at 780° C., and reduction hydrogen was introduced in the sintering process. After sintering, the material was naturally cooled to a temperature lower than 80° C. and discharged to obtain a calcined material. The calcined material was crushed, sieved, demagnetized, and then subjected to vacuum packaging to obtain the positive active material of Comparative Example 2 of the present disclosure.

[Fabrication of Lithium Ion Secondary Battery]

The positive plates, the separators and the negative plates of Examples 1-13 and Comparative Examples 1-2 were sequentially stacked, the separators were located between the positive plates and the negative plates, and then, the positive plates, the separators and the negative plates were wound into bare cells. A tab was welded for the bare cell, the bare cell was mounted into an aluminum shell, baking was performed at 80° C. to remove water, an electrolyte solution was then injected, and sealing was performed to obtain an uncharged secondary battery. The uncharged secondary battery sequentially underwent processes of standing, hot and cold pressing, formation, shaping, capacity testing, or the like, to obtain a lithium ion secondary battery product.

[Test of Related Parameters of Positive Active Material]

1. Test of Content $N_{Li+}\%$ of Free Lithium

The content $N_{Li+}\%$ of the free lithium was tested according to the standard GB/T 9725-2007. At a room temperature, 30 g of each of the positive active materials of all the examples and all the comparative examples was taken and added to 100 mL of water, and the mixture was stirred for 30 min and filtered. 25 mL of filtrate was taken, dilute hydrochloric acid with a concentration C of 0.1 mol/L was dropwise added, and a change curve of pH with the addition amount of the dilute hydrochloric acid was recorded. An abrupt change point may appear in the curve within the pH range of 4-5.5, and an addition volume V of the dilute hydrochloric acid at the abrupt change point was recorded. For detailed parameter setting, reference may be made to WI-PCA-034 "Free lithium Potential Titration Test Work Guideline (Lithium Iron)". The content of the free lithium corresponding to each of all the examples and all the comparative examples was calculated according to the following formula:

$$N_{Li+}\% = C \times V \times 4 \times 6.941/30 \times 100\%.$$

2. Test of pH of Positive Active Material

The pH of the positive active material was tested in accordance with GB/T 9724-2007. At a room temperature, 10 g of each of the positive active materials of all the examples and all the comparative examples was taken and added to 100 mL of water, and the mixture was stirred for 30 min, stood for 90 min and was filtered. The pH of the filtrate of each of all the examples and all the comparative examples was measured by a pH meter (model: pHS-3 C) and was a pH value of the corresponding positive active material. For detailed parameter setting, reference may be made to WI-PCA-031 "Powder and Emulsion PH Test Work Guideline".

3. Test of Powder Compaction Density 1 g of the positive active material of each of all the examples and comparative examples was weighed and charged into a cylindrical mold with a circular hole having a cross-sectional area of S. 3 t of pressure was applied to the powder in the mold and maintained for 30 s, and a thickness of the powder was recorded as t. The powder compaction density of the positive active material corresponding to each of all the examples and all the comparative examples may be calculated by the following formula:

$$\rho = m/(S \times t).$$

4. Test of Electrode Plate Compaction Density

An electrode plate was cut into a film with a length of 1,000 mm, and the film was rolled at certain pressure to have a length of 1,006 mm due to ductility of aluminum foil. Then, 1,540.25 mm² small disks were punched out of the film, and weights M and thicknesses L of the small disks were measured. Pure aluminum foil was punched into 1,540.25 mm² small disks, a mass M0 of the empty aluminum foil was weighed, and then, the compaction density of the positive plate corresponding to each of all the examples and all the comparative examples may be calculated by the following formula:

$$PD = (M-M0)/1.54025/2/L.$$

5. Test of Carbon Content

The carbon content of the positive active material in each of all the examples and comparative examples was tested using an infrared absorption method after the positive active material was combusted by a high-frequency induction furnace, and a specific test process was performed in accordance with the standard GB/T 20123-2006/ISO 15350:2000.

6. Test of Specific Surface Area

The specific surface area of the positive active material of each of all the examples and comparative examples was tested by a Tristar3020 instrument, and a specific test process was performed in accordance with the standard GB/T 19587-2004.

7. Test of Dv10, Dv50

Dv10 and Dv50 of the positive active material of each of all the examples and comparative examples were analyzed and tested with the particle size distribution laser diffraction method according to the standard GB/T 19077-2016 using a Mastersizer 2000E laser particle size analyzer from Malvern Instruments Ltd.

8. Test of Powder Resistivity

The powder resistivity of the positive active material of each of all the examples and comparative examples was tested using a powder resistivity tester (ST2722), and analyzed and tested according to the standard GB/T 30835-2014.

9. ICP Test Process

An elemental test of the positive active material of each of all the examples and comparative examples was performed using inductively coupled plasma atomic emission spectrometry. For details, reference may be made to EPA 6010D-2014 "Inductively Coupled Plasma-Optical Emission Spectrometry", and a test instrument was ICP-OES.

[Battery Performance Test]

1. Test of Gram Capacity of Button Cell

The positive active material of Example 1, a binder (polyvinylidene fluoride (PVDF)) and a conductive agent (acetylene black) were mixed according to a mass ratio of 95:5:5, a proper quantity of solvents (N-methyl pyrrolidone (NMP)) were added, and the mixture was fully stirred and mixed to form uniform positive slurry. Aluminum foil with a positive current collector having a thickness of 1 μm was coated with the slurry, and then, drying and cold pressing were performed. Then, the aluminum foil was punched into small disks with a diameter of 14 mm as positive plates. A button half cell was assembled using a polypropylene separator with a thickness of 12 μm and the electrolyte solution in the example with a lithium plate as the negative electrode. The button half cell was charged and discharged at rates of 0.1 C and 1 C, and the gram capacities at different rates were recorded.

Tests of the gram capacities of the button cells for the positive active materials of the other examples and comparative examples were the same as the process of the test of the gram capacity of the button cell for the positive active material of Example 1.

2. Cycle Performance Test

The lithium ion secondary batteries of all the examples and comparative examples were placed in a 60° C. oven, stand for 2 h, and then subjected to charging-discharging tests. One charging-discharging cycle process was as follows: the lithium ion secondary battery was charged to 3.65V at a constant current of 1 C, and continuously charged at the constant voltage until the charging current was less than 0.05 C, and then, charging was stopped; the process was paused for 5 min; the lithium ion secondary battery was discharged to 2.5V at a constant current of 1 C; the process was paused for 5 min. The above process was one charging-discharging cycle of the battery and was repeated until the battery capacity was attenuated to 80% of an initial value, and a cycle number was recorded.

Related parameters of the positive active materials and battery performance test parameters of all the examples and comparative examples were listed in Tables 1 and 2 respectively.

TABLE 1

Table of related parameters of positive active materials of examples and comparative examples

| Number | Substrate•fast iron conductor | x:(1 − x) | Specific surface area S | Carbon content C % | S/C | Content $N_{Li+}$ % of free lithium | pH | pH- $(36_{Li}^+ + 8)$ | Powder resistivity | Dv 10 | Dv 50 | Powder compaction density |
|---|---|---|---|---|---|---|---|---|---|---|---|---|
| Example 1 | LiFePO$_4$•Li$_2$FeTi(PO$_4$)$_3$ | 0.997:0.003 | 13 | 1.3 | 10.15 | 0.023 | 9.36 | 0.53 | 3.5 | 0.6 | 1.6 | 2.55 |
| Example 2 | LiFePO$_4$•Li$_2$FeZr(PO$_4$)$_3$ | 0.997:0.003 | 14 | 1.2 | 10.86 | 0.017 | 9.28 | 0.66 | 3.7 | 0.5 | 1.4 | 2.56 |
| Example 3 | LiFePO$_4$•Li$_2$FeSn(PO$_4$)$_3$ | 0.997:0.003 | 13 | 1.3 | 10.58 | 0.018 | 9.29 | 0.63 | 2.7 | 0.6 | 1.8 | 2.57 |
| Example 4 | LiFePO$_4$•Li$_2$FeTi(PO$_4$)$_3$ | 0.997:0.003 | 14 | 1.2 | 11.67 | 0.018 | 9.71 | 1.06 | 4.3 | 0.6 | 1.8 | 2.53 |
| Example 5 | LiFePO$_4$•Li$_2$FeTi(PO$_4$)$_3$ | 0.997:0.003 | 12 | 1.3 | 9.53 | 0.02 | 9.13 | 0.41 | 2.7 | 0.5 | 1.7 | 2.59 |
| Example 6 | LiFePO$_4$•Li$_2$FeTi(PO$_4$)$_3$ | 0.998:0.002 | 14 | 1.3 | 10.45 | 0.028 | 9.2 | 0.19 | 7.9 | 0.5 | 1.4 | 2.53 |
| Example 7 | LiFePO$_4$•Li$_2$FeTi(PO$_4$)$_3$ | 0.999:0.001 | 15 | 1.5 | 10.14 | 0.027 | 9.15 | 0.18 | 10.8 | 0.4 | 1.2 | 2.55 |
| Example 8 | LiFePO$_4$•Li$_2$FeTi(PO$_4$)$_3$ | 0.99:0.01 | 14 | 1.4 | 10.44 | 0.019 | 9.73 | 1.04 | 2.6 | 0.6 | 1.6 | 2.55 |
| Example 9 | LiFePO$_4$•Li$_2$FeTi(PO$_4$)$_3$ | 0.997:0.003 | 15 | 1.2 | 12.53 | 0.012 | 9.9 | 1.48 | 8.7 | 0.5 | 1.7 | 2.54 |
| Example 10 | LiFePO$_4$•Li$_2$FeTi(PO$_4$)$_3$ | 0.997:0.003 | 11 | 1.3 | 8.28 | 0.026 | 9.06 | 0.12 | 9.8 | 0.5 | 1.3 | 2.54 |
| Example 11 | LiFePO$_4$•Li$_2$FeTi(PO$_4$)$_3$ | 0.997:0.003 | 12.9 | 1.29 | 10.00 | 0.017 | 9.23 | 0.618 | 3.2 | 0.75 | 3 | 2.4 |
| Example 12 | LiFePO$_4$•Li$_2$FeTi(PO$_4$)$_3$ | 0.995:0.005 | 13.2 | 1.2 | 10.56 | 0.016 | 9.31 | 0.734 | 3.1 | 0.51 | 1.5 | 2.59 |
| Example 13 | LiFePO$_4$•Li$_2$FeTi(PO$_4$)$_3$ | 0.997:0.003 | 14.1 | 1.38 | 10.22 | 0.02 | 9.58 | 0.86 | 18.7 | 0.38 | 1 | 2.53 |
| Comparative Example 1 | LiFePO$_4$ | / | 14 | 1.4 | 10.22 | 0.013 | 8.28 | −0.17 | 12.2 | 0.5 | 1.6 | 2.54 |
| Comparative Example 2 | LiFePO$_4$ | / | 1.3 | 0 | / | 0.018 | 9.69 | 1.042 | >2E$^5$ | 0.83 | 5.3 | 2.68 |

TABLE 2

Battery performance test parameters of examples and comparative examples

| Example | First charging gram capacity of button cell | First discharging gram capacity of button cell @0.1 C | Gram capacity of button cell @1 C | Electrode plate compaction density | Circle number |
|---|---|---|---|---|---|
| Example 1 | 159.5 | 158.8 | 142.5 | 2.5 | 1500 |
| Example 2 | 158.7 | 157.8 | 140.1 | 2.5 | 1500 |
| Example 3 | 159.8 | 157.3 | 140.1 | 2.5 | 1500 |
| Example 4 | 158.2 | 160.1 | 144.5 | 2.5 | 1450 |
| Example 5 | 159 | 157.6 | 140.2 | 2.5 | 1550 |
| Example 6 | 160.1 | 158.3 | 140.4 | 2.5 | 1550 |
| Example 7 | 160.4 | 157.2 | 138.3 | 2.5 | 1500 |
| Example 8 | 156.7 | 157.2 | 143.2 | 2.5 | 1500 |
| Example 9 | 159.8 | 160 | 146.3 | 2.5 | 1300 |
| Example 10 | 159.9 | 155.2 | 137.1 | 2.5 | 1600 |
| Example 11 | 160.5 | 158.4 | 140.7 | 2.45 | 1500 |
| Example 12 | 158 | 157.1 | 142.9 | 2.5 | 1500 |

TABLE 2-continued

Battery performance test parameters of examples and comparative examples

| Example | First charging gram capacity of button cell | First discharging gram capacity of button cell @0.1 C | Gram capacity of button cell @1 C | Electrode plate compaction density | Circle number |
|---|---|---|---|---|---|
| Example 13 | 159.3 | 156.7 | 137.1 | 2.5 | 1500 |
| Comparative Example 1 | 160.6 | 153.1 | 134 | 2.5 | 1500 |
| Comparative Example 2 | 33.9 | 30.4 | 19.1 | / | / |

[Analysis of Influence of Fast Ion Conductor of NASICON Structure on Gram Capacity of Positive Active Material]

By combining Tables 1 and 2, the positive active material of each of Examples 1-13 includes the fast ion conductor layer having the fast ion conductor of a NASICON structure and has a significantly improved gram capacity (0.1 C discharge gram capacity and 1 C discharge gram capacity) compared to Comparative Examples 1 and 2.

Furthermore, Examples 1-3 show that the fast ion conductors $Li_2FeTi(PO_4)_3$, $Li_2FeZr(PO_4)_3$ and $Li_2FeSn(PO_4)_3$ containing different types of metal elements significantly improve the gram capacity of the positive active material (0.1 C discharge gram capacity and 1 C discharge gram capacity) compared to Comparative Examples 1 and 2.

Compared with Examples 1-13, in Comparative Example 1, only the carbon coating layer is provided, and no fast ion conductor layer is provided, and in Comparative Example 2, both the carbon coating layer and the fast ion conductor layer are not provided, and the corresponding positive active materials have significantly lower 0.1 C discharge gram capacities and 1 C discharge gram capacities than those of Examples 1-13.

[Analysis of Influence of Content of Fast Ion Conductor of NASICON Structure on Gram Capacity of Positive Active Material]

By combining Tables 1 and 2 and comprehensively comparing Examples 1, 6, 7, 8 and 11 with Comparative Example 1, when $Li_2FeTi(PO_4)_3$ in the positive active material has a molar weight of $0<x\leq0.005$ and the corresponding $LiFePO_4$ has a molar weight of $0.995\leq1-x<1$, the gram capacity of the positive active material is higher than that of Example 8 (x exceeds 0.05) and Comparative Example 1 (x=0). The positive active material corresponding to Example 8 (x exceeds 0.05) has a lower first charging gram capacity and 0.1 C discharge gram capacity, and Comparative Example 1 (x=0) corresponds to a significantly reduced gram capacity (0.1 C discharge gram capacity and 1 C discharge gram capacity) of the positive active material.

[Analysis of Influence of Ratio S/C of Specific Surface Area S to Mass Percentage Content C of Carbon]

By combining Tables 1 and 2 and comprehensively comparing Examples 1, 4, 5, 9 and 10, the corresponding positive active material have good 0.1 C and 1 C gram capacities and achieve a good cycle performance of the lithium ion secondary battery when S/C ranges from 9 to 12. However, when S/C exceeds 12, the cycle performance of the lithium ion secondary battery is lowered as shown in Example 9. When S/C is lower than 9, the 0.1 C and 1 C gram capacities of the corresponding positive active materials are low.

[Analysis of Influence of pH on Gram Capacity of Positive Active Material]

By combining Tables 1 and 2 and comprehensively comparing all the examples and comparative examples, in Examples 1-15, the presence of the fast ion conductor layer may accelerate extraction of the active lithium in the bulk phase structure in the lithium iron phosphate substrate, and therefore, pH is higher than that in Comparative Example 1.

[Analysis of Influence of pH-$(36N_{Li+}+8)$]

By combining Tables 1 and 2 and comprehensively comparing Examples 1, 4, 5, 7, 8, 9 and 10, the corresponding positive active material have good 0.1 C and 1 C gram capacities and achieve the good cycle performance of the lithium ion secondary battery when pH-$(36N_{Li+}+8)$ ranges from 0.15 to 1.1. However, when pH-$(36N_{Li+}+8)$ exceeds 1.1, the cycle performance of the corresponding lithium secondary battery is lowered as shown in Example 9. When pH-$(36N_{Li+}+8)$ is lower than 0.15, the 0.1 C and 1 C gram capacities of the corresponding positive active materials are low.

[Influence of Particle Size Distribution of Positive Active Material on Powder Compaction Density]

By combining Tables 1 and 2 and comprehensively comparing Examples 1-13, when the positive active material has a powder volume particle size satisfying 1 µm≤Dv50≤2 µm and 0.4 µm≤Dv10≤0.7 µm, the corresponding positive active materials have reasonable particle size distribution as a whole and have powder compaction density ($\rho\geq2.5$ g/cm$^3$). However, as in Example 11, large Dv50 influences the overall particle size distribution of the positive active material to a certain degree, and thus, the corresponding positive active material achieves low powder compaction density and low electrode plate compaction density. Similarly, when Dv10 is lower than 0.4 µm (Example 13) or higher than 0.7 µm (Example 11), the overall particle size distribution of the corresponding positive active material is influenced to a certain degree, and thus, the corresponding positive active material achieves low powder compaction density and low electrode plate compaction density.

[Influence of Powder Resistivity on Gram Capacity of Positive Active Material]

By combining Tables 1 and 2 and comprehensively comparing Examples 1, 4, 5, 9 and 10, the positive active materials have good 0.1 C and 1 C gram capacities when having powder resistivity R less than or equal to 11 Ω·cm. However, when the powder resistivity R of the positive active material exceeds 11 Ω·cm, the 0.1 C and 1 C gram capacities are reduced to a certain extent as in Example 13.

It should be noted that the present disclosure is not limited to the above embodiments. The above-mentioned embodiments are merely illustration, and embodiments having substantially the same configuration as the technical idea and exerting the same effects within the scope of the technical solution of the present disclosure are all included in the technical scope of the present disclosure. Furthermore, other embodiments configured by applying various modifications that can be conceived by those skilled in the art to the embodiments and combining some constituent elements in the embodiments are also included in the scope of the present disclosure without departing from the scope of the gist of the present disclosure.

What is claimed is:

1. A positive active material, comprising:
a substrate and a coating layer, wherein the coating layer coats the substrate, and the coating layer comprises a fast ion conductor layer and a carbon coating layer,
the substrate comprises more than one compound as shown in formula (I):

$$LiFe_{1-a}M1_aPO_4 \qquad \text{formula (I), wherein}$$

in the formula (I), M1 is one of more selected from Cu, Mn, Cr, Zn, Pb, Ca, Co, Ni, Sr, Nb and Ti, and $0 \leq a \leq 0.01$,
the fast ion conductor layer comprises a fast ion conductor of a NASICON structure as shown in formula (II), $$Li_{3-b}Fe_{2-b}M2_b(PO_4)_3 \qquad \text{formula (II), wherein}$$

in the formula (II), M2 is one or more selected from Ti, Zr, Hf, Ge and Sn with valence of +4, and $0<b\leq1$,
the carbon has a mass percentage content C % of 1%-1.5% in the positive active material;
the positive active material has a specific surface area S of 10 m²/g-15 m²/g; and
a ratio of the specific surface area S to the carbon content C % of the positive active material satisfies $9 \leq S/C \leq 12$.

2. The positive active material according to claim 1, wherein in the positive active material, a molar ratio of the $LiFe_{1-a}M1_aPO_4$ and the $Li_{3-b}Fe_{2-b}M2_b(PO_4)_3$ satisfies $(1-x):x$, and $0<x\leq0.005$.

3. The positive active material according to claim 1, wherein the positive active material has pH not less than 9.

4. The positive active material according to claim 1, wherein the positive active material has a volume average particle size satisfying 1 μm≤Dv50≤2 μm and 0.4 μm≤Dv10≤0.7 μm.

5. The positive active material according to claim 1, wherein the positive active material has a powder compaction density ρ≥2.5 g/cm³.

6. The positive active material according to claim 1, wherein the positive active material has a powder resistivity R≤11 Ω·cm.

7. The positive active material according to claim 1, wherein a positive plate fabricated from the positive material has an electrode plate compaction density of 2.5 g/cm³.

8. A lithium ion secondary battery, comprising the positive active material according to claim 1.

9. The lithium ion secondary battery according to claim 8, comprising:
a positive plate, comprising a positive current collector and a positive film layer provided on at least one surface of the positive current collector and containing the positive active material, and when a button cell is formed by the positive plate and a lithium metal plate, in a 0.1 C charging-discharging curve of the button cell, a charging-discharging platform exists within a voltage range of 2.5-2.9 V vs Li⁺.

10. A battery module, comprising the lithium ion secondary battery according to claim 8.

11. A battery pack, comprising more than one of the lithium ion secondary battery according to claim 8.

12. An electric device, comprising:
more than one of the lithium ion secondary battery according to claim 8, wherein the lithium ion secondary battery is used as a power source of the electric device or an energy storage unit of the electric device.

13. A positive active material, comprising:
a substrate and a coating layer, wherein the coating layer coats the substrate, and the coating layer comprises a fast ion conductor layer and a carbon coating layer,
the substrate comprises more than one compound as shown in formula (I):

$$LiFe_{1-a}M1_aPO_4 \qquad \text{formula (I), wherein}$$

in the formula (I), M1 is one of more selected from Cu, Mn, Cr, Zn, Pb, Ca, Co, Ni, Sr, Nb and Ti, and $0 \leq a \leq 0.01$,
the fast ion conductor layer comprises a fast ion conductor of a NASICON structure as shown in formula (II), $$Li_{3-b}Fe_{2-b}M2_b(PO_4)_3 \qquad \text{formula (II), wherein}$$

in the formula (II), M2 is one or more selected from Ti, Zr, Hf, Ge and Sn with valence of +4, and $0 \leq b \leq 1$,
free lithium is present in the positive active material, and a pH of the positive active material and a mass percentage content $N_{Li+}$% of the free lithium satisfy $0.15 \leq pH-(36N_{Li+}+8) \leq 1.1$.

14. The positive active material according to claim 1, wherein the fast ion conductor of the NASICON structure is selected from the group consisting of $Li_2FeTi(PO_4)_3$, $Li_2FeZr(PQ_4)_3$, $Li_2FeSn(PO_4)_3$, and any combination thereof.

15. The positive active material according to claim 1, wherein the positive active material is in a form of primary particles or a pseudo-single crystal.

16. The positive active material according to claim 13, wherein in the positive active material, a molar ratio of the $LiFe_{1-a}M1_aPO_4$ and the $Li_{3-b}Fe_{2-b}M2_b(PO_4)_3$ satisfies $(1-x):x$, and $0<x\leq0.005$.

17. The positive active material according to claim 13, wherein the positive active material has a volume average particle size satisfying 1 μm≤Dv50≤2 μm and 0.4 μm≤Dv10≤0.7 μm.

18. The positive active material according to claim 13, wherein the positive active material has a powder compaction density ρ≥2.5 g/cm³ and a powder resistivity R≤11 Ω·cm.

19. The positive active material according to claim 13, wherein a positive plate fabricated from the positive material has an electrode plate compaction density of 2.5 g/cm³.

20. The positive active material according to claim 13, wherein the fast ion conductor of the NASICON structure is selected from the group consisting of $Li_2FeZr(PQ_4)_3$, $Li_2FeSn(PO_4)_3$, and a combination thereof.

* * * * *